(12) United States Patent
Proulx

(10) Patent No.: US 9,639,888 B2
(45) Date of Patent: May 2, 2017

(54) PROVIDING INTERACTIVE NOTIFICATIONS FOR COMPLETING ONLINE TRANSACTIONS

(71) Applicant: Adobe Systems Incorporated, San Jose, CA (US)

(72) Inventor: Jason Proulx, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 78 days.

(21) Appl. No.: 14/479,486

(22) Filed: Sep. 8, 2014

(65) Prior Publication Data
US 2016/0071194 A1 Mar. 10, 2016

(51) Int. Cl.
*G06Q 30/06* (2012.01)
*G06Q 20/32* (2012.01)
*G06Q 20/14* (2012.01)
*G06Q 20/40* (2012.01)
*H04M 1/725* (2006.01)
*G06Q 20/12* (2012.01)

(52) U.S. Cl.
CPC ......... *G06Q 30/0641* (2013.01); *G06Q 20/12* (2013.01); *G06Q 20/14* (2013.01); *G06Q 20/322* (2013.01); *G06Q 20/401* (2013.01); *G06Q 30/0633* (2013.01); *H04M 1/72577* (2013.01)

(58) Field of Classification Search
None
See application file for complete search history.

(56) References Cited

U.S. PATENT DOCUMENTS

| | | | | |
|---|---|---|---|---|
| 2008/0133349 A1* | 6/2008 | Nazer | ............... | G06Q 20/12 705/14.39 |
| 2010/0332337 A1* | 12/2010 | Bullock | ............... | G06Q 20/12 705/26.82 |
| 2013/0036023 A1 | 2/2013 | Koplovitz et al. | | |
| 2013/0086490 A1* | 4/2013 | Roskind | ............... | G06F 17/30902 715/760 |
| 2013/0124276 A1* | 5/2013 | Brown | ............... | G06Q 30/0241 705/14.4 |

(Continued)

OTHER PUBLICATIONS

"Find your lost phone with Android Device Manage," Official Android Blog, Aug 2, 2013, https://android.googleblog.com/2013/08/findyourlostphonewithandroid.html.*

(Continued)

*Primary Examiner* — Kathleen Palavecino
*Assistant Examiner* — Lance Cai
(74) *Attorney, Agent, or Firm* — Kilpatrick Townsend & Stockton LLP

(57) ABSTRACT

Systems and methods are disclosed for providing interactive notifications for completing online transactions. In some embodiments, a processing device determines that completing an online transaction initiated at a mobile device requires fewer than a threshold number of operations. The processing device also generates an interface for obtaining input to initiate at least one subsequent operation for completing the online transaction. The interface is generated based on determining that completing the online transaction requires fewer than the threshold number of operations. The processing device configures the mobile device to display the interface and to receive the input using the interface for completing the transaction.

19 Claims, 4 Drawing Sheets

(56) References Cited

U.S. PATENT DOCUMENTS

2013/0325612 A1  12/2013  Sommerville et al.

OTHER PUBLICATIONS

Omojola, Ayo, Forbes Entrepreneurs, Push Notifications for Abandoned Carts: A Guide for Retailers Going Mobile, https://www.forbes.com/sites/ayoomojola/2013/09/05, Sep. 5, 2013, 9 pages.

Miva, M-Commerce Marketing: Using Push Notifications for Abandoned Carts, https://www.mivamerchant.com/blog/m-commerce-marketing-using-push-notifications, Sep. 23, 2013, 7 pages.

Taylor, Tabatha, Cartrescuer, Abandoned Carts and Push Notifications: Ecommerce Site Tips for Going Mobile, https://cartrescuer.com/blog/2013/12/08/abandoned-carts-and-push-notifcations-ecommerce, Dec. 8, 2013, 11 pages.

Artisan, Artisan Gives Mobile Push Messaging a Makeover, http://useartisan.com/news/press/artisan-gives-mobile-push-messaging-makeover, Jun. 17, 2014, 3 pages.

Constine, Josh, Techcrunch, ops 8'S Interactive Notifications Let you Respond to Push or Texts Without Switching Apps, http://techcrunch.com/2014/06/02/actionable-push-notifications/ posted Jun. 2, 2014, 7 pages.

\* cited by examiner

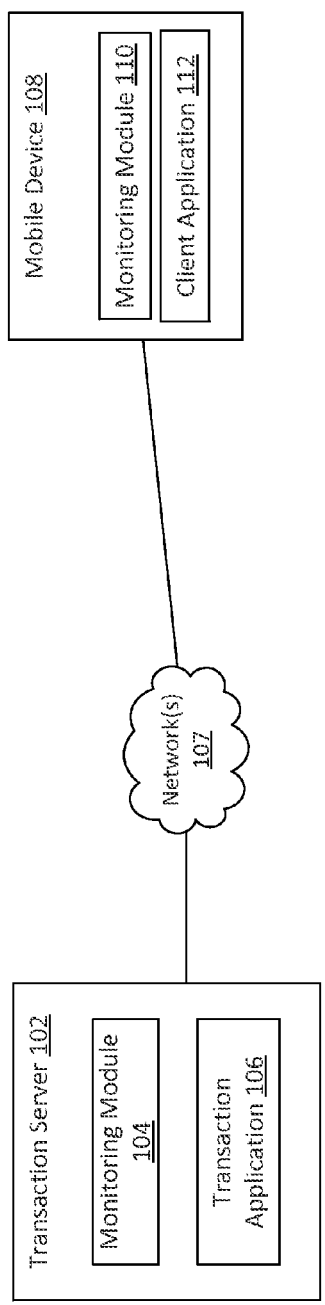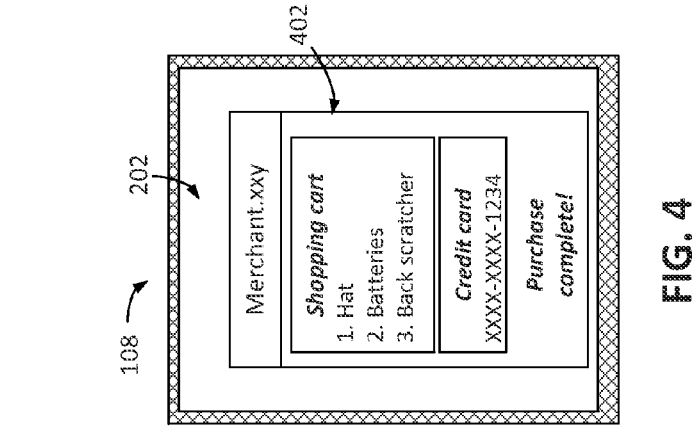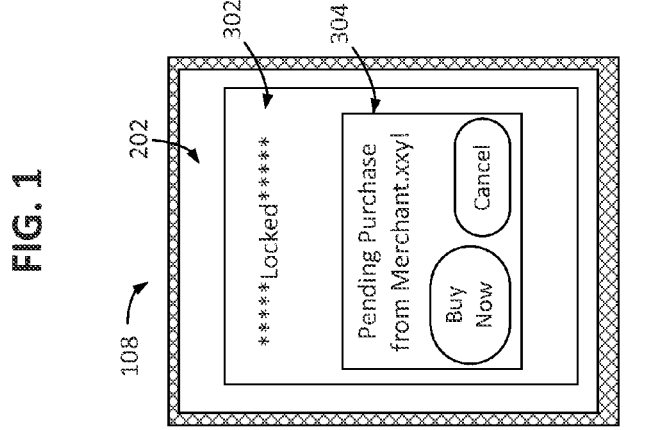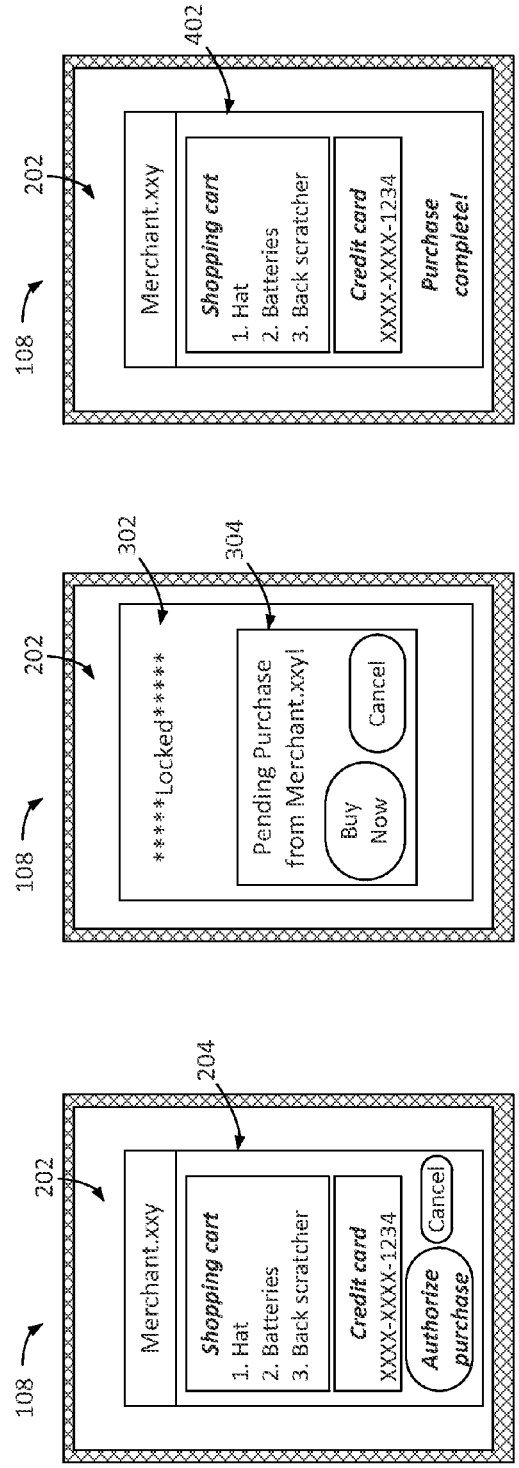

US 9,639,888 B2

PROVIDING INTERACTIVE NOTIFICATIONS FOR COMPLETING ONLINE TRANSACTIONS

TECHNICAL FIELD

This disclosure relates generally to computer-implemented methods and systems and more particularly relates to providing interactive notifications for completing online transactions.

BACKGROUND

Mobile computing devices can allow users to conduct online transactions (e.g., purchases of goods or services via a website). However, electronic commerce via mobile devices can involve an increased risk of abandoned transactions as compared to in-person shopping. For example, users shopping on mobile devices may be more susceptible to distraction or context switching (e.g., switching from a web browser application to a text messaging application in response to receiving a text message). Thus, a user may initiate an online purchase with an electronic shopping cart, but may become distracted and fail to complete the purchase. Cart abandonment can negatively impact profits for many online retailers.

Current solutions for reducing abandonment of online transactions involve sending notifications to users. For example, an online merchant may send an e-mail to a user's e-mail address indicating that products are available in an online shopping cart. The user can access a link to the online merchant via the e-mail.

These solutions may be insufficient for facilitating the completion of online transactions. For example, simple push notifications and emails require the performance of multiple steps for the user to return to the online transaction and complete it (e.g., navigating from the notification to an e-mail program, opening a message in the e-mail program, clicking a link in the message to the purchaser's website). A distracted user of a mobile device may be less likely to perform such a multi-step process to complete a transaction.

It is desirable to provide improved solutions for facilitating the completion of online transactions using mobile devices.

SUMMARY

According to certain embodiments, systems and methods are provided for generating interactive notifications that facilitate the completion of online transactions using mobile devices. In some embodiments, a processing device determines that completing an online transaction initiated at a mobile device requires fewer than a threshold number of operations. The processing device also generates an interface for obtaining input to initiate at least one subsequent operation for completing the online transaction. The interface is generated based on determining that completing the online transaction requires fewer than the threshold number of operations. The processing device configures the mobile device to display the interface. The processing device also configures the mobile device to receive input for completing the online transaction using the interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where:

FIG. 1 is a block diagram depicting an example of a system that includes a transaction server and a mobile device for performing online transactions according to certain exemplary embodiments;

FIG. 2 is a diagram depicting an example of an interface used by the mobile device for performing online transactions according to certain exemplary embodiments;

FIG. 3 is a diagram depicting an example of a notification interface provided to the mobile device for completing an online transaction according to certain exemplary embodiments;

FIG. 4 is a diagram depicting an example of an updated interface presented at the mobile device after using the notification interface to complete the online transaction according to certain exemplary embodiments;

DETAILED DESCRIPTION

Figure 5:
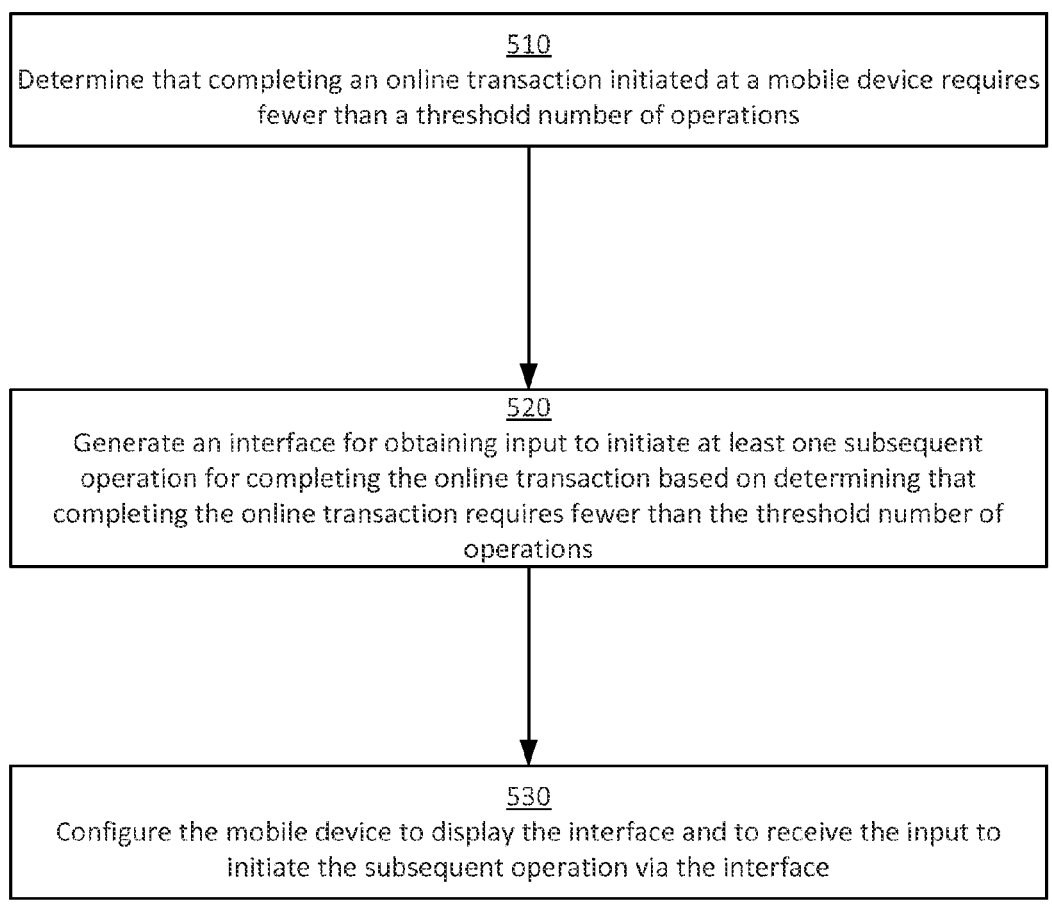
FIG. 5 is a flow chart illustrating an example of a method for providing interactive notifications for completing online transactions according to certain exemplary embodiments.

Computer-implemented systems and methods are disclosed for providing interactive notifications for completing online transactions. The status of an online transaction (e.g., the purchase of a product) initiated by a mobile device can be monitored to determine that a user has not yet completed the transaction. Push notifications that include interactive messages can be transmitted to the mobile device or generated at the mobile device. The interactive messages can prompt the user for a decision regarding the transaction. The interactive message can allow the user to complete or cancel the transaction at the time that the message is displayed. The interactive message can thereby prompt a user to complete the transaction in a manner that is more likely to cause the user to commit to a decision regarding the transaction (i.e., completion or cancellation of the transaction).

The following non-limiting example is provided to help introduce the general subject matter of certain embodiments. A mobile device can establish a session with a web server or other transaction server for conducting online transactions. The mobile device can initiate a transaction with the web server, such as selecting one or more products or services for purchase. A user of the mobile device may not immediately complete the transaction. For example, the user may be distracted from the pending purchase or be indecisive about the pending purchase. A monitoring program that is executed at one or both of the server and the mobile device can detect that the mobile device has not completed the transaction and has not taken any action regarding the transaction for a specified period of time. The monitoring program can also determine that a small number of operations are required to complete the transaction. For example, completing the transaction may only involve clicking a "submit" button if the user has already entered his or her payment information. The monitoring program can generate a notification interface based on determining that the user has not taken any action regarding the transaction for a specified period of time and that a small number of operations are required to complete the transaction. The notification interface can be used to notify the user that the transaction is incomplete. The notification interface can also be used for obtaining input for completing the online transaction. The notification interface can be displayed at the mobile device immediately after the notification interface is generated at or received by the mobile device. The user can enter input via the displayed notification interface that either completes the transaction or cancels the transaction.

Referring now to the drawings, FIG. 1 is a block diagram depicting an example of a system that includes a transaction server 102 and a mobile device 108 for performing online transactions. The transaction server 102 can communicate with one or more mobile devices 108 via signals communicated via one or more data networks 107. In some embodiments, the transaction server 102 can be a server device. In other embodiments, the transaction server 102 can include multiple computing systems that are configured for grid-based computing or cloud computing.

The mobile device 108 can include any computing device that can access the transaction server 102 and perform one or more operations involved in an online transaction. Non-limiting examples of a mobile device 108 include smart phones, tablet computers, laptop computers, etc.

The transaction server 102 can include one or more processing devices that can execute program code stored in a non-transitory computer-readable medium. The program code can include a monitoring module 104 and a transaction application 106. The mobile device 108 can include one or more processing devices that can execute program code stored in a non-transitory computer-readable medium. The program code can include a monitoring module 110 and a client application 112.

The transaction application 106 can be, for example, a web server application for purchasing goods or services. The client application 112 can be used to access the transaction application 106 to perform one or more online transactions. Non-limiting examples of the client application 112 include a browser application, a native application executed at the mobile device for remotely accessing the transaction application 106, etc.

One or both of the monitoring modules 104, 110 can be used to monitor the status of an online transaction between the transaction application 106 and the client application 112. One or both of the monitoring modules 104, 110 can determine that the online transaction has been initiated, but not completed. One or both of the monitoring modules 104, 110 can generate a notification or other interface that can prompt a user of the mobile device 108 to complete the online transaction or cancel the transaction.

In some embodiments, the monitoring module 104 can monitor the transaction application 106 on behalf of the mobile device 108 based on determining that the mobile device 108 is a smart phone or other device that is likely to be utilized by a single user. For example, the monitoring module 104 can monitor online transactions initiated by mobile device 108 based on receiving a device identifier from the mobile device 108 (or from a telecommunication network in communication with the mobile device 108) that identifies the mobile device 108 as a smart phone or other single-user device. In additional or alternative embodiments, the monitoring module 110 can monitor the client application 112 based on determining that the mobile device 108 is a smart phone or other device that is likely to be utilized by a single user. For example, the monitoring module 110 can monitor online transactions initiated by mobile device 108 based on receiving a device identifier from an operating system of the mobile device 108 that identifies the mobile device 108 as a smart phone or other single-user device.

Restricting one or more of the monitoring modules 104, 110 to monitoring online transactions initiated using a single-user mobile device 108 can reduce the risk of online transactions being initiated by a first user of a computing device and being completed by a second user of the same computing device without authorization by the first user. For example, the owner of a smart phone will likely be the only user of the smart phone. Thus, an interactive notification for completing a transaction that is provided to a smart phone is more likely to be presented to the user who initiated the transaction as compared to a notification that would be provided to a user of a different type of computing device (e.g., a desktop computer).

In additional or alternative embodiments, the monitoring module 110 can monitor the client application 112 based on determining that the mobile device 108 used to initiate an online transaction at a first point in time is being utilized by the same user at a second point in time. For example, the monitoring module 110 can monitor online transactions initiated by mobile device 108 during a session or other time period in which a user has been authenticated for accessing the mobile device 108 (e.g., by entering a password or other passcode, by providing biometric information for authenticating a user, etc.). In some embodiments, the monitoring module 110 can pause or terminate monitoring of the client application based on a user logging out of the mobile device 108 or otherwise terminating an authenticated session with the mobile device 108. In additional or alternative embodiments, the monitoring module 110 can pause or terminate monitoring of the client application based on the mobile device 108 entering a locked state (e.g., if a given user of the mobile device 108 has not used the mobile device 108 for a certain period of time). In some embodiments, the monitoring module 110 may pause or terminate monitoring of the client application based on the mobile device 108 having a certain device type (e.g., tablet, laptop, etc.) that is more likely to be used by multiple users. In other embodiments, the monitoring module 110 may continue monitoring of the client application if the mobile device 108 enters a locked state and a user is logged into the mobile device 108 or has otherwise been authenticated by the mobile device 108. For example, interactive notifications may be provided to a user of a locked mobile device 108 (e.g., a laptop in a screensaver state, a laptop in a lock screen state, etc.) if the user has logged into the device. In this example, the current user of the mobile device 108 is known to the monitoring module 110 (e.g., by logging into the device) but may be not currently authorized to use the device (e.g., if the user has not entered a password or other credential for unlocking the device). In additional or alternative embodiments, the monitoring module 110 may determine that monitoring of the client application should not be paused or terminated based on the mobile device 108 having a certain device type (e.g., a smart phone) that is more likely to be used by a single user.

FIG. 2 is a diagram depicting an example of an interface 204 used by the mobile device 108 for performing online transactions. The client application 112 can configure the mobile device 108 to display the interface 204 at a screen 202. In a non-limiting example, the interface 204 can be a webpage of a website for accessing an online merchant (e.g., "Merchant.xyz"). A user of the mobile device 108 can initiate an online transaction via the interface 204. For example, the mobile device 108 can be used to select one or more products for an online purchase. The selected products can be displayed in the interface 204. The interface 204 can also be used to enter payment or billing information for the transaction, such as a credit card number used to purchase the selected products. The interface 204 can also include interaction objects, such as clickable buttons for authorizing the purchase and cancelling the purchase.

After inputting the information used for the online transaction at the interface 204, the user may become distracted. For example, the user may receive a phone call at the mobile device 108 while conducting the online transaction. During the call, the mobile device 108 may enter a locked state that hides the interface 204. At the completion of the call, the user may put away the mobile device 108 and forget about the online transaction.

One or both of the monitoring modules 104, 110 can generate a notification interface that prompts the user to complete the online transaction. For example, FIG. 3 is a diagram depicting an example of a notification interface 304 provided to the mobile device 108 for completing an online transaction. The notification interface 304 can include one or more interaction objects that can be used to obtain input for completing or cancelling the transaction. For example, the notification interface 304 depicted in FIG. 3 includes a clickable button for completing the purchase (i.e., "Buy Now") and a clickable button for cancelling the purchase (i.e., "Cancel"). In some embodiments, the notification interface 304 can be generated at transaction server 102 and transmitted to the mobile device 108 by the monitoring module 104. In other embodiments, the notification interface 304 can be generated at the mobile device 108 by the monitoring module 110. The mobile device 108 can display the notification interface 304 at the screen 202 in response to the mobile device 108 receiving or generating the notification interface 304.

In some embodiments, the notification interface 304 can be displayed on top of or in place of interfaces for other applications executed at the mobile device 108. For example, as depicted in FIG. 3, the notification interface 304 can be displayed on top of a lock interface 302 that indicates that the mobile device 108 has entered a locked state. A lock interface 302 can include any interface or interface elements used by an operating system of the mobile device 108 to regulate access to the mobile device 108. For example, the lock interface 302 can be displayed to require that a user perform a specific action or group of actions in order to access other applications of the mobile device 108. Non-limiting examples of such an action or group of actions include entering a password, providing a certain combination of inputs to buttons of the mobile device 108, performing a specific gesture using a touchscreen of the mobile device 108, etc.

The mobile device 108 can execute a suitable operating system that allows interactive notifications to be displayed in a lock interface 302. In some embodiments, an operating system of the mobile device 108 can have a default setting that allows notifications generated by one or more of the monitoring modules 104, 110 to be displayed in the lock interface 302. In additional or alternative embodiments, an operating system of the mobile device 108 can be configured by a user to allow notifications generated by one or more of the monitoring modules 104, 110 to be displayed in the lock interface 302 (e.g., by selecting preferences for an application that includes or communicates with one or more of the monitoring modules 104, 110).

FIG. 3 depicts the notification interface 304 being displayed in a lock interface 302 for illustrative purposes. Other implementations are possible. For example, in some embodiments, the notification interface 304 can be displayed by the mobile device 108 on top of or in place of other interfaces for other active applications executed by the mobile device 108. In additional or alternative embodiments, the monitoring module 110 can configure the mobile device 108 to prevent interactions with other application at the mobile device 108 until an input has been received via the notification interface 304 (e.g., an input that causes an online transaction to be completed or an input that causes an online transaction to be cancelled). The monitoring module 110 can do so without presenting a lock interface 302 at the mobile device 108.

The input received by the notification interface 304 can be used to automatically complete the online transaction without additional actions by the users. The client application 112 can utilize the input from the notification interface 304 (i.e., clicking the button labeled "Buy Now") to complete the transaction by authorizing the online purchase previously initiated at the mobile device 108. FIG. 4 is a diagram depicting an example of an updated interface 404 presented at the mobile device 108 after using the notification interface 304 to complete the online transaction.

FIG. 5 is a flow chart illustrating an example of a method 500 for providing interactive notifications for completing online transactions. For illustrative purposes, the method 500 is described with reference to the examples and implementation depicted in FIGS. 1-4. Other implementations, however, are possible.

The method 500 involves determining that completing an online transaction initiated at a mobile device 108 requires fewer than a threshold number of operations, as depicted in block 510. In some embodiments, a processing device of the transaction server 102 can execute a monitoring module 104 to determine that the mobile device 108 has initiated a transaction and to identify one or more operations required for completing the transaction. In additional or alternative embodiments, a processing device of the mobile device 108 can execute a monitoring module 110 to determine that the mobile device 108 has initiated a transaction and to identify one or more operations required for completing the transaction. A processing device can determine that the mobile device 108 has initiated a transaction by accessing one or more records of transactions from a database or other data structure stored in a non-transitory computer-readable medium. The processing device can retrieve or otherwise obtain one or more records associated with the mobile device 108 that includes information about the online transaction. The processing device can determine from the obtained record that the online transaction has been initiated but not completed. The processing device can also identify one or more operations for completing the transaction based on information from the obtained record. In a non-limiting example, a processing device of the transaction server 102 or the mobile device 108 can determine that an online transaction includes a potentially abandoned shopping cart for an online merchant.

The shopping cart or other online transaction can be identified as potentially abandoned based on any suitable criteria. In some embodiments, one or more of the monitoring modules 104, 110 can identify a shopping cart or other online transaction as potentially abandoned based on a specified amount of time elapsing without the mobile device 108 performing an operation related to the shopping cart or other online transaction. In additional or alternative embodiments, one or more of the monitoring modules 104, 110 can identify a shopping cart or other online transaction as potentially abandoned based on the mobile device 108 entering a locked state after the online transaction has been initiated. In additional or alternative embodiments, one or more of the monitoring modules 104, 110 can identify a shopping cart or other online transaction as potentially abandoned based on the mobile device 108 navigating away from an application or interface used to initiate the online transaction. In one non-limiting example of such navigation, the mobile device 108 may receive input closing a web browser tab or window used to initiate the online transaction. In another non-limiting example such navigation, the mobile device 108 may receive input for accessing another application on the mobile device 108 other than an application used to initiate the online transaction. In some embodiments, one or more of the monitoring modules 104, 110 can identify a shopping cart or other online transaction as potentially abandoned rather than cancelled based on determining that the mobile device 108 has not been used to perform an explicit operation to cancel the transaction (e.g., clicking a "cancel" button in an online shopping cart interface 204).

In some embodiments, the threshold number of operations can be identified based on the feasibility of using a single notification interface that can be presented at the mobile device 108 to obtain all of the required inputs for completing the transaction. A larger threshold number of operations (e.g., 3-5 operations) can be used for a mobile device 108 having a larger display screen (e.g., a display screen having a dimension or area greater than a threshold dimension or area). A smaller threshold number of operations (e.g., 1-2 operations) can be used for a mobile device 108 having a smaller display screen (e.g., a display screen having a dimension or area smaller than a threshold dimension or area). In one non-limiting example, one or more of the monitoring modules 104, 110 can determine that completing the online transaction involves multiple operations (e.g., selecting one or more options for a product to be purchased and authorizing the purchase). One or more of the monitoring modules 104, 110 can determine whether a display screen of the mobile device 108 is sufficiently large to display a notification interface that can be used to perform each of the multiple operations (e.g., a notification interface that can be used to present multiple buttons for selecting the product options and another button for authorizing the purchase).

In additional or alternative embodiments, one or more of the monitoring modules 104, 110 can wherein determine that completing the online transaction requires fewer than the threshold number of operations based on a quantity and/or a type of additional data to be entered by a user to complete the transaction. In one example, one or more of the monitoring modules 104, 110 can determine that billing information or other data has not been provided by one of the parties to the online transaction (e.g., a user of the mobile device 108). One or more of the monitoring modules 104, 110 can determine that entering the additional data requires multiple data inputs (e.g., keystrokes for typing data into the mobile device 108). One or more of the monitoring modules 104, 110 can determine that the number of data inputs for entering the additional data is greater than the threshold number of operations for completing the transaction.

In another example, one or more of the monitoring modules 104, 110 can determine that billing information or other additional data required for the transaction has previously been provided for the online transaction. For example, one or more of the monitoring modules 104, 110 can determine from an electronic record of an online purchase that all required fields of an online order form have been completed. One or more of the monitoring modules 104, 110 can determine that only one operation (e.g., a command to authorize the online transaction) or a relatively small number of single-click operations (e.g., a selection from a list of shipping options and a command to authorize the online transaction) is required to complete the transaction. One or more of the monitoring modules 104, 110 can determine that completing the online transaction requires fewer than the threshold number of operations based on determining that the billing information or other additional data has been previously provided and that the transaction can be completed using only one operation or a relatively small number of single-click operations.

The method 500 also involves generating an interface for obtaining input to initiate at least one subsequent operation for completing the online transaction based on determining that completing the online transaction requires fewer than the threshold number of operations, as depicted in block 520. In some embodiments, a processing device of the transaction server 102 can execute a monitoring module 104 to generate the interface. In additional or alternative embodiments, a processing device of the mobile device 108 can execute a monitoring module 110 to generate the interface. A non-limiting example of an interface is a "push" notification message that can be displayed on a mobile device 108, such as the notification interface 304 depicted in FIG. 3.

Generating the interface can include generating one or more interaction objects that are used for receiving input indicative of one or more commands to perform one or more subsequent operations for completing the online transaction. In one non-limiting example, the interface can include a clickable button or other interaction object labeled "Buy Now." Input that is received using the clickable button can be indicative of a command to authorize an online transaction. In another non-limiting example, the interface can include a menu (e.g., a drop-down menu, a set of check boxes, a set of radio buttons, etc.) for selecting one or more options associated with the online transaction (e.g., shipping information, product options such as size or color, etc.). Input that is received using the menu can be indicative of a command to authorize the online transaction with the selected options.

The method 500 also involves configuring the mobile device 108 to display the interface and to receive the input to initiate the at least one subsequent operation via the interface, as depicted in block 530. A processing device can execute suitable programming code for configuring the mobile device 108 to display the interface. The processing device can execute suitable programming code for configuring a touchscreen or other input device of the mobile device 108 to receive input via the interface.

One or more of the monitoring modules 104, 110 can be used to configure the mobile device 108 to display the interface. In some embodiments, the transaction server 102 can execute the monitoring module 104 to transmit or otherwise provide a message via a data network 107 to the mobile device 108. The message can include a command to display the interface and receive input via the interface. The mobile device 108 can respond to the command by displaying the interface and configuring one or more input devices to receive the input. In additional or alternative embodiments, the mobile device 108 can execute the monitoring module 110 to generate one or more signals that can be provided from a processing device of the mobile device 108 to a display device of the mobile device 108. The processing device can provide the generated signals to the display device via a data bus of the mobile device 108. The monitoring module 110 can also configure the processing device to respond to inputs received using the interface.

In some embodiments, one or more of the operations depicted in blocks 510, 520, 530 can be performed in response to or based on one or more hardware characteristics of the mobile device 108. A suitable processing device can execute one or more of the monitoring modules 104, 110 or other suitable program code to identify one or more hardware characteristics of the mobile device 108. In some embodiments, one or more operations can be performed in response to or based on the mobile device 108 being a certain device type (e.g., a smart phone, a tablet computer, etc.). One or more of the monitoring modules 104, 110 may generate interactive notifications based on determining that the device type is associated with certain hardware or software constraints (e.g., display screen size, available processing power, available memory, etc.). In some embodiments, the hardware or software constraints can be determined from the device type for the mobile device 108. In additional or alternative embodiments, the monitoring module 104 can identify the hardware or software constraints from communications with the mobile device 108 via the data network 107. In additional or alternative embodiments, the monitoring module 110 can identify the hardware or software constraints from communications with an operating system or other software executed at the mobile device 108.

In some embodiments, providing interactive notifications for completing online transactions as described herein can reduce a processing load on a mobile device 108, which may prolong the operational lifespan of the mobile device 108. For example, a mobile device must perform multiple operations involved in completing an online transaction if a user is required to first navigate from a text notification regarding an online transaction to an e-mail application describing the transaction and then navigate from the e-mail application to a web browser application for completing the transaction. In some embodiments, if an interactive notification is provided to the mobile device 108 as described herein, the mobile device can perform fewer operations for completing the online transaction (e.g., clicking a "complete purchase" button), thereby requiring fewer processing resources (e.g., processor time, memory allocation, utilization of a display device, etc.) for completing the online transaction.

In additional or alternative embodiments, one or more of the monitoring modules 104, 110 can collect data for generating analytics related to online transactions that involve one or more mobile devices 108. For example, each notification interface generated for a respective online transaction can include a first interaction object for cancelling the online transaction and a second interaction object for obtaining input to complete the additional online transaction. A non-limiting example of a notification interface 304 generated by a monitoring module is depicted in FIG. 3. A first online transaction can be cancelled in response to receiving input in a first interface via the first interaction object that is indicative of a cancellation command. A second online transaction can be completed in response to receiving input in a second interface via the second interaction object that is indicative of an authorization command. One or more of the monitoring modules 104, 110 can log or otherwise obtain data regarding the cancellation of the first transaction and the completion of the second transaction. One or more of the monitoring modules 104, 110 can generate analytical data based on the data for the cancellation of the first transaction and the completion of the second transaction.

Figure 6:
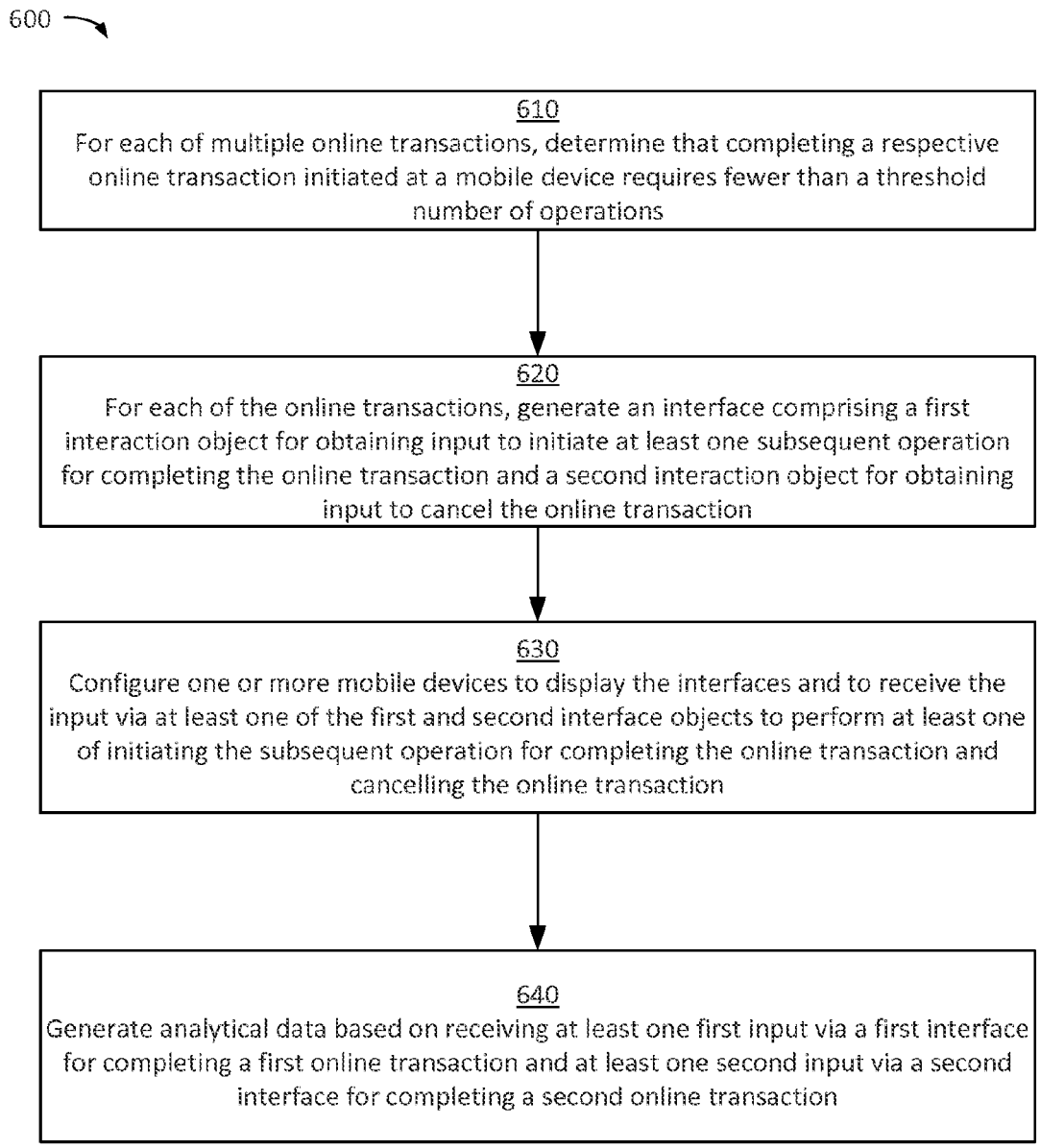
FIG. 6 is a flow chart illustrating an example of a method for using interactive notifications to obtain analytics regarding online transactions.

FIG. 6 is a flow chart illustrating an example of a method 600 for using interactive notifications to obtain analytics regarding online transactions. For illustrative purposes, the method 600 is described with reference to the examples and implementation depicted in FIGS. 1-5. Other implementations, however, are possible.

The method 600 involves determining, for each of multiple online transactions, that completing an online transaction initiated at a mobile device 108 requires fewer than a threshold number of operations, as depicted in block 610. A suitable processing device can execute one or more of the monitoring modules 104, 110 to determine that a mobile device 108 has initiated a transaction and to identify one or more operations required for completing the transaction. For each online transaction, the determination that the transaction initiated at a given mobile device 108 requires fewer than a threshold number of operations can be performed in a manner similar to that described above with respect to block 510 of method 500. The online transactions can be initiated using, for example, different client applications 112 (e.g., different web browsers), different instances of the same client application 112 (e.g., the same type of web browser or native application being executed at different mobile devices 108), or some combination thereof. In some embodiments, the multiple online transactions can include different online transactions initiated by different mobile devices 108. In additional or alternative embodiments, the multiple online transactions can include different online transactions initiated using the same mobile device 108. In additional or alternative embodiments, the online transactions can include a combination of multiple online transactions initiated using the same mobile device 108 and multiple online transactions initiated using different mobile devices 108.

The method 600 also involves generating, for each of the online transactions, an interface that includes a first interaction object for obtaining input to initiate at least one subsequent operation for completing the online transaction and a second interaction object for obtaining input to cancel the online transaction, as depicted in block 620. Each notification interface can be generated based on determining that completing the online transaction requires fewer than the threshold number of operations. A suitable processing device can execute one or more of the monitoring modules 104, 110 to generate a notification interface or other suitable interface. For each online transaction, the notification interface can be generated in a manner similar to that described above with respect to block 520 of method 500.

In some embodiments, each generated notification interface can include one or more interaction objects or other electronic content items that are specific to a respective online transaction. For example, a generated notification interface for a given online purchase may include a summary of the items to be purchased. In other embodiments, each generated notification interface can include a standard set of interaction objects or other electronic content. For example, each generated notification interface may be limited to a message that a purchase from a merchant is pending, a first interaction object for completing the purchase, and a second interaction object for cancelling the purchase.

The method 600 also involves configuring one or more mobile devices 108 to display the generated interfaces and to receive the input via at least one of the first and second interface objects to initiate the subsequent operation for completing the online transaction or to cancel the online transaction, as depicted in block 630. A processing device can execute suitable programming code for configuring the same mobile device 108 to display multiple notification interfaces for multiple transactions, for configuring the different mobile device 108 to display different notification interfaces for different transactions, or some combination thereof. The processing device can execute suitable programming code for configuring a touchscreen or other input device of the one or more mobile devices 108 to receive input via the displayed notification interfaces. For each online transaction, a mobile device can be configured to display the notification interface and receive input via the notification interface in a manner similar to that described above with respect to block 630 of method 600.

The method 600 also involves generating analytical data based on receiving at least one first input via a first interface for completing a first one of the online transactions and at least one second input via a second interface for completing a second one of the online transactions, as depicted in block 640. A suitable processing device can execute one or more of the monitoring modules 104, 110 or other suitable program code to collect data for generating analytics related to the online transactions for which the notification interfaces are generated. One or more of the monitoring modules 104, 110 can log or otherwise obtain data regarding the cancellation of the first transaction and the completion of the second transaction. One or more of the monitoring modules 104, 110 can generate analytical data based on the data for the cancellation of the first transaction and the completion of the second transaction.

In additional or alternative embodiments, analytical data can be generated based on the absence of a response to an interactive notification (e.g., the notification was observed, ignored and no action was taken). For example, a suitable processing device can execute one or more of the monitoring modules 104, 110 or other suitable program code to collect data for generating analytics related an absence of a response to an interactive notification associated with an online transaction. One or more of the monitoring modules 104, 110 can log or otherwise obtain data regarding the absence of the response.

In some embodiments, one or more of the monitoring modules 104, 110 can identify or otherwise determine the absence of a response based on an absence of interaction with the notification interface for a specified period of time. For example, one or more of the monitoring modules 104, 110 can initiate a timer simultaneously or near simultaneously with presenting a notification interface. One or more of the monitoring modules 104, 110 can determine that no response has been received based on the timer expiring without input being received via the notification interface. In some embodiments, one or more of the monitoring modules 104, 110 can cause the notification interface to be removed from the display screen after expiration of the timer without the receipt of an input to the interactive notification.

In additional or alternative embodiments, one or more of the monitoring modules 104, 110 can identify or otherwise determine the absence of a response based on a detection of user interaction with the mobile device 108 and an absence of interaction with the notification interface. For example, after a notification is presented at the mobile device 108, one or more of the monitoring modules 104, 110 can detect or receive information indicating that one or more controls on the mobile device 108 have been actuated (e.g., by pressing a button to illuminate the display screen in a locked state).

One or more of the monitoring modules 104, 110 can identify or otherwise determine the absence of a response based on a control of the mobile device 108 being actuated without input being subsequently received via the interactive notification. In another example, after a notification is presented at the mobile device 108, one or more of the monitoring modules 104, 110 can detect or receive information indicating that one or more components of the mobile device 108 have been moved. For instance, one or more of the monitoring modules 104, 110 can detect or receive information indicating that an orientation of the mobile device 108 has been changed (e.g., by moving the mobile device from a vertical to a horizontal orientation as the user raises the mobile device 108 to view the device screen, by rotating a smart phone or mobile device 108 such that the screen is facing a different direction, by moving the screen of a laptop to an open position, etc.). One or more of the monitoring modules 104, 110 can identify or otherwise determine the absence of a response based on one or more components of the mobile device 108 being moved without a subsequent interaction with the interactive notification.

In some embodiments, one or more of the monitoring modules 104, 110 can initiate a timer in response to a detection of user interaction with the mobile device 108 (e.g., actuating a control, moving the device, etc.). One or more of the monitoring modules 104, 110 can determine the absence of an interaction with an interactive notification based on the timer expiring without an input being received via the interactive notification interface. In some embodiments, one or more of the monitoring modules 104, 110 can cause the notification interface to be removed from the display screen after expiration of the timer without the mobile device 108 receiving an input to the interactive notification.

Generating data distinguishing between an explicit cancellation of an online transaction using a notification interface and an absence of response to a notification interface can provide more detailed analytics about user behavior with respect to interactive notifications as compared to generating analytics based only on an absence of response to a notification interface (or a completion of a transaction via the interface). For example, analytical data describing positive responses (e.g., completion of an online transaction using a notification interface), negative responses (e.g., an explicit cancellation of the online transaction using the notification interface) and null responses (e.g., an absence of input received via the notification interface) can allow marketers and other analytical entities to determine if a user is interested in certain products or services, if the user expressed no preference in certain products or services, or if the user is disinterested in certain products or services. Thus, capturing a non-null, negative response can be used to identify such anti-preferences (e.g., users' expressed disinterest) for determining future consumer behavior.

In some embodiments, providing interactive notifications for completing online transactions as described herein can improve one or more functions performed by a system that includes multiple mobile devices or other computing devices in communication with servers that perform online transactions. In a non-limiting example, interactive notifications for completing online transactions can be used to generate or otherwise obtain analytics regarding online purchases or other transactions. The analytics regarding online purchases or other transactions can be used to identify circumstances under which promotions, notifications, or other electronic communications provided from a transaction server to other computing devices are more likely to be effective (e.g., by resulting in a revenue generating event). Identifying one or more circumstances under which these electronic communications are more likely to be effective can allow the transaction server to limit the transmission of these electronic communications to those circumstances. Limiting the transmission of electronic communications to circumstances under which the electronic communications may be more effective can reduce the data traffic between the transaction server and the computing devices and thereby result in a more efficient use of the communication networks between the transaction server and the computing device.

Figure 7:
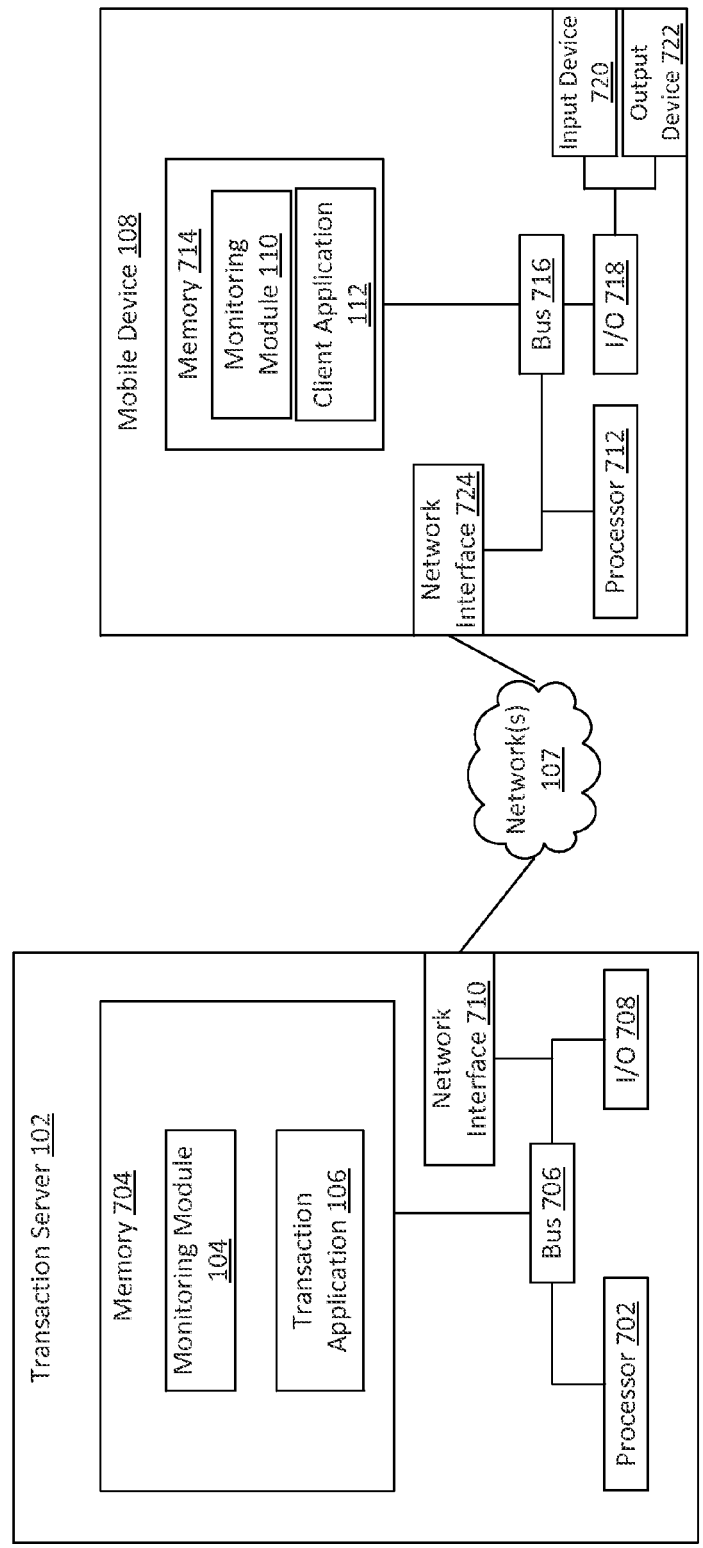
FIG. 7 is a block diagram depicting examples of implementations of a transaction server and a mobile device according to certain exemplary embodiments according to certain exemplary embodiments.

Any suitable computing system or group of computing systems can be used to implement the transaction server 102 and the mobile device 108. For example, FIG. 7 is a block diagram depicting examples of implementations of a transaction server 102 and a mobile device 108 according to certain exemplary embodiments.

The transaction server 102 can include a processor 702 that is communicatively coupled to a memory 704 and that executes computer-executable program code and/or accesses information stored in the memory 704. The processor 702 may comprise a microprocessor, an application-specific integrated circuit ("ASIC"), a state machine, or other processing device. The processor 702 can include any of a number of processing devices, including one. Such a processor can include or may be in communication with a computer-readable medium storing instructions that, when executed by the processor 702, cause the processor to perform the operations described herein.

The memory 704 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The transaction server 102 may also comprise a number of external or internal devices such as input or output devices. For example, the transaction server 102 is shown with an input/output ("I/O") interface 708 that can receive input from input devices or provide output to output devices. A bus 706 can also be included in the transaction server 102. The bus 706 can communicatively couple one or more components of the transaction server 102.

The transaction server 102 can execute program code that configures the processor 702 to perform one or more of the operations described above with respect to FIGS. 1-6. The program code can include one or more of the monitoring module 104 and the transaction application 106. The program code may be resident in the memory 704 or any suitable computer-readable medium and may be executed by the processor 702 or any other suitable processor. In some embodiments, one or more of the monitoring module 104 and the transaction application 106 can be resident in the memory 704, as depicted in FIG. 7. In additional or alternative embodiments, one or more of the monitoring module 104 and the transaction application 106 can be resident in a memory that is accessible via a data network, such as a memory accessible to a cloud service.

The transaction server 102 can also include at least one network interface device 710. The network interface device 710 can include any device or group of devices suitable for establishing a wired or wireless data connection to one or more data networks 107. Non-limiting examples of the network interface device 710 include an Ethernet network adapter, a modem, and/or the like. The transaction server 102 can transmit messages as electronic or optical signals via the network interface device 710.

The mobile device 108 can include a processor 712 that is communicatively coupled to a memory 714 and that executes computer-executable program code and/or accesses information stored in the memory 714. The processor 712 may comprise a microprocessor, an application-specific integrated circuit ("ASIC"), a state machine, or other processing device. The processor 712 can include any of a number of processing devices, including one. Such a processor can include or may be in communication with a computer-readable medium storing instructions that, when executed by the processor 712, cause the processor to perform the operations described herein.

The memory 714 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The mobile device 108 can also include a bus 716. The bus 716 can communicatively couple one or more components of the mobile device 108.

The mobile device 108 can also include a number of external or internal devices such as input or output devices. For example, the mobile device 108 is shown with an input/output ("I/O") interface 718 that can receive input from one or more input devices 720 or provide output to one or more output devices 722. The one or more input devices 720 and one or more output devices 722 can be communicatively coupled to the I/O interface 718. The communicative coupling can be implemented via any suitable manner (e.g., a connection via a printed circuit board, connection via a cable, communication via wireless transmissions, etc.). Non-limiting examples of input devices 720 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 722 include an LCD screen, an external monitor, a speaker, or any other device that can be used to display or otherwise present outputs generated by a computing device.

The mobile device 108 can execute program code that configures the processor 712 to perform one or more of the operations described above with respect to FIGS. 1-6. The program code can include one or more of the monitoring module 110 and the client application 112. The program code may be resident in the memory 714 or any suitable computer-readable medium and may be executed by the processor 712 or any other suitable processor. In some embodiments, the monitoring module 110 can be omitted.

The mobile device 108 can also include at least one network interface device 724. The network interface device 724 can include any device or group of devices suitable for establishing a wired or wireless data connection to one or more data networks 107. Non-limiting examples of the network interface device 724 include an Ethernet network adapter, a modem, and/or the like. The mobile device 108 can transmit messages as electronic or optical signals via the network interface device 724.

In some aspects, a computing system or environment can include at least one mobile device 108. In additional or alternative aspects, a system can be formed by establishing communication between a transaction server 102 and multiple mobile devices 108.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for preventing unwanted terminations of online transactions, the method comprising:
    determining, by a transaction server in communication with a mobile device via a data network, that completing an online transaction initiated at the mobile device using the data network requires fewer than a threshold number of operations;
    determining that a potential abandonment condition exists for the online transaction, wherein determining that the potential abandonment condition exists comprises:
        detecting that the mobile device has entered a locked state, wherein detecting that the mobile device has entered the locked state comprises determining, based on communications with the mobile device via the data network, that the mobile device will not accept input unless the mobile device receives specific information required to cause it to enter another state in which the mobile device is able to accept input, and
        detecting that the mobile device has navigated away from an interface used to initiate the online transaction, wherein detecting that the mobile device has navigated away from the interface comprises determining, based on communications with the mobile device via the data network, that the mobile device has performed at least one of (i) navigating away from a first interface used to initiate the online transaction or (ii) receiving input to access a second interface on the mobile device;
    generating, by the transaction server, an interface for obtaining input to initiate at least one subsequent operation for completing the online transaction based on determining that the potential abandonment conditions exists and that completing the online transaction requires fewer than the threshold number of operations; and
    transmitting, via the data network, the generated interface and a message to the mobile device via the data network, wherein the message instructs the mobile device to display the interface and to receive the input to initiate the at least one subsequent operation via the interface.

2. The method of claim 1, wherein determining that completing the online transaction requires fewer than the threshold number of operations comprises:
    determining that billing information has previously been provided for the online transaction; and
    determining that the at least one subsequent operation comprises a command to authorize the online transaction, wherein the interface includes an interaction object for receiving input indicative of the command.

3. The method of claim 1, wherein the message further instructs the mobile device to display the interface at a lock interface of the mobile device and receive the input to the interface when the mobile device is in the locked state.

4. The method of claim 1, further comprising performing the at least one subsequent operation in response to receiving the input to initiate the at least one subsequent operation that has been entered via the interface.

5. The method of claim 4, further comprising:
determining, by the transaction server, that completing an additional online transaction initiated at the mobile device requires fewer than the threshold number of operations;
generating, by the transaction server, an additional interface based on determining that completing the additional online transaction requires fewer than the threshold number of operations, wherein the additional interface comprises a first interaction object for cancelling the additional online transaction and a second interaction object for obtaining input to complete the additional online transaction; and
configuring the mobile device to display the additional interface and to receive input to the first and second interaction objects;
cancelling the additional online transaction in response to receiving the input via the additional interface; and
generating analytical data based on completing the online transaction and cancelling the additional online transaction.

6. The method of claim 1, further comprising:
determining that no input has been received via the interface; and
generating analytical data based on the determined absence of input to the interface.

7. The method of claim 6, wherein determining that no input has been received via the interface comprises:
determining that at least one of a movement of the mobile device and an actuation of a control of the mobile device has occurred;
initiating a timer in response to determining that at least one of the movement and the actuation has occurred; and
determining that no input is received via the interface before expiration of the timer.

8. The method of claim 1, further comprising configuring the mobile device to display the interface by transmitting an electronic signal from a processing device of the mobile device to a display device of the mobile device, wherein the electronic signal is transmitted via a data bus of the mobile device that connects the display device and the processing device.

9. The method of claim 1, wherein the interface is also generated based on identifying a processing resource constraint of the mobile device.

10. A system comprising:
a processing device; and
a non-transitory computer-readable medium communicatively coupled to the processing device,
wherein the processing device is configured to execute instructions to perform operations comprising:
determining that completing an online transaction initiated at a mobile device requires fewer than a threshold number of operations;
determining that a potential abandonment condition exists for the online transaction, wherein determining that the potential abandonment condition exists comprises at least one of:
detecting that the mobile device has entered a locked state, wherein detecting that the mobile device has entered the locked state comprises determining, based on communications with the mobile device via the data network, that the mobile device will not accept input unless the mobile device receives specific information required to cause it to enter another state in which the mobile device is able to accept input, and
detecting that the mobile device has navigated away from an interface used to initiate the online transaction, wherein detecting that the mobile device has navigated away from the interface comprises determining, based on communications with the mobile device via the data network, that the mobile device has performed at least one of (i) navigating away from a first interface used to initiate the online transaction or (ii) receiving input to access a second interface on the mobile device;
generating an interface for obtaining input to initiate at least one subsequent operation for completing the online transaction based on determining that the potential abandonment conditions exists and that completing the online transaction requires fewer than the threshold number of operations; and
configuring the mobile device to display the interface and to receive the input to initiate the at least one subsequent operation via the interface.

11. The system of claim 10, wherein the operations for determining that completing the online transaction requires fewer than the threshold number of operations comprise:
determining that billing information has previously been provided for the online transaction; and
determining that the at least one subsequent operation comprises a command to authorize the online transaction, wherein the interface includes an interaction object for receiving input indicative of the command.

12. The system of claim 10, wherein the operations for configuring the mobile device to display the interface and to receive the input to initiate the at least one subsequent operation via the interface comprise configuring the mobile device to display the interface at a lock interface of the mobile device and receive the input to the interface when the mobile device is in the locked state.

13. The system of claim 10, wherein the operations further comprise:
performing the at least one subsequent operation in response to receiving the input to initiate the at least one subsequent operation that has been entered via the interface;
determining that completing an additional online transaction initiated at the mobile device requires fewer than the threshold number of operations;
generating an additional interface based on determining that completing the additional online transaction requires fewer than the threshold number of operations, wherein the additional interface comprises a first interaction object for cancelling the additional online transaction and a second interaction object for obtaining input to complete the additional online transaction; and
configuring the mobile device to display the additional interface and to receive input to the first and second interaction objects;
cancelling the additional online transaction in response to receiving the input via the additional interface; and
generating analytical data based on completing the online transaction and cancelling the additional online transaction.

14. The system of claim 10, further comprising a network interface device, wherein the operations for configuring the mobile device comprise configuring the network interface device to transmit a message via a data network to the mobile device, wherein the message comprises a command to display the interface and to receive the input.

15. The system of claim 10, further comprising a display device communicatively coupled to the processing device via a data bus, wherein the operations for configuring the mobile device comprise transmitting an electronic signal from the processing device to the via the data bus.

16. A non-transitory computer-readable medium having program code stored thereon that is executable by a processing device, the program code comprising:
   program code for configuring a transaction server for determining that completing an online transaction initiated, with the transaction server and at a mobile device, requires fewer than a threshold number of operations;
   program code for determining that a potential abandonment condition exists for the online transaction, wherein determining that the potential abandonment condition exists comprises at least one of:
      detecting that the mobile device has entered a locked state, wherein detecting that the mobile device has entered the locked state comprises determining, based on communications with the mobile device via the data network, that the mobile device will not accept input unless the mobile device receives specific information required to cause it to enter another state in which the mobile device is able to accept input, and
      detecting that the mobile device has navigated away from an interface used to initiate the online transaction, wherein detecting that the mobile device has navigated away from the interface comprises determining, based on communications with the mobile device via the data network, that the mobile device has performed at least one of (i) navigating away from a first interface used to initiate the online transaction or (ii) receiving input to access a second interface on the mobile device;
   program code for generating an interface for obtaining input to initiate at least one subsequent operation for completing the online transaction based on determining that the potential abandonment conditions exists and that completing the online transaction requires fewer than the threshold number of operations; and
   program code for transmitting, from the transaction server via the data network, the generated interface and a message to the mobile device, wherein the message instructs the mobile device to display the interface and to receive the input to initiate the at least one subsequent operation via the interface.

17. The non-transitory computer-readable medium of claim 16, wherein determining that completing the online transaction requires fewer than the threshold number of operations comprises:
   determining that billing information has previously been provided for the online transaction; and
   determining that the at least one subsequent operation comprises a command to authorize the online transaction, wherein the interface includes an interaction object for receiving input indicative of the command.

18. The non-transitory computer-readable medium of claim 16, wherein the message instructs the mobile device to display the interface at a lock interface of the mobile device and receive the input to the interface when the mobile device is in the locked state.

19. The non-transitory computer-readable medium of claim 16, further comprising:
   program code for performing the at least one subsequent operation in response to receiving the input to initiate the at least one subsequent operation that has been entered via the interface;
   program code for determining that completing an additional online transaction initiated at the mobile device requires fewer than the threshold number of operations;
   program code for generating an additional interface based on determining that completing the additional online transaction requires fewer than the threshold number of operations, wherein the additional interface comprises a first interaction object for cancelling the additional online transaction and a second interaction object for obtaining input to complete the additional online transaction; and
   program code for configuring the mobile device to display the additional interface and to receive input to the first and second interaction objects;
   program code for cancelling the additional online transaction in response to receiving the input via the additional interface; and
   program code for generating analytical data based on completing the online transaction and cancelling the additional online transaction.

* * * * *